US006566486B1

(12) United States Patent
Joachimi et al.

(10) Patent No.: US 6,566,486 B1
(45) Date of Patent: May 20, 2003

(54) METHOD OF PRODUCING BRANCHED POLYAMIDES

(75) Inventors: Detlev Joachimi, Krefeld (DE); Hans-Jürgen Dietrich, Frankfurt (DE); Heinrich Morhenn, Köln (DE); Cliff Scherer, Schwalmtal (DE); Andreas Gittinger, Krefeld (DE); Friedrich-Karl Bruder, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/868,835
(22) PCT Filed: Dec. 10, 1999
(86) PCT No.: PCT/EP99/09770
§ 371 (c)(1), (2), (4) Date: Jun. 20, 2001
(87) PCT Pub. No.: WO00/39192
PCT Pub. Date: Jul. 6, 2000

(30) Foreign Application Priority Data

Dec. 23, 1998 (DE) .......................................... 198 59 929

(51) Int. Cl.⁷ ........................ C08G 69/08; C08G 69/14; C08G 73/10

(52) U.S. Cl. ........................ 528/310; 528/312; 528/322; 528/323; 528/329.1; 528/332; 528/335; 528/336; 526/64; 526/66; 524/600; 524/606; 264/512; 264/513; 264/514; 264/515

(58) Field of Search .................................. 528/310, 312, 528/322, 323, 332, 329.4, 335, 336; 524/600, 606; 526/64, 66; 264/512, 513–515

(56) References Cited

U.S. PATENT DOCUMENTS 4,963,610 A * 10/1990 Schmid et al. ............... 524/436
5,039,786 A * 8/1991 Pipper et al. ................ 528/324
5,760,163 A   6/1998 Fisch et al. .................. 528/310

* cited by examiner

*Primary Examiner*—P. Hampton-Hightower
(74) *Attorney, Agent, or Firm*—Joseph C. Gil; Aron Preis

(57) ABSTRACT

A process for the production of polyamides is disclosed. In a first reaction step, suitable monomers such as caprolactam or an aliphatic aminocarboxylic acid are reacted with polyfunctional amines, which contain at least one secondary amino group, and/or with salts containing such amines and dicarboxylic acids. The reaction product is in a further process step undergoes solid phase post-condensation.

15 Claims, No Drawings

METHOD OF PRODUCING BRANCHED POLYAMIDES

The application provides an at least two-stage process for the production of polyamides and the use of the polyamides obtained therefrom for applications such as, for example, injection moulding, extrusion, extrusion blow moulding and thermoforming.

Polyamides are a class of polymers which have proven successful for many years. They are characterised in particular by easy processability, very good mechanical properties, very good electrical properties, elevated heat resistance, good resistance to chemicals and very good surface quality.

Polyamides may be produced using various processes and be synthesised from very many different units and, alone or in combination with processing auxiliaries, stabilisers, polymeric alloying components (for example elastomers) or also reinforcing materials (such as for example mineral fillers or glass fibres), may be provided with specific combinations of properties to yield materials for specific applications.

The properties of polyamides may be improved by addition of elastomers, for example with regard to the impact toughness of, for example, reinforced polyamides. The large number of possible combinations makes it possible to create a very large number of products having the most varied properties.

Numerous processing methods are known for the production of polyamides, wherein, depending upon the desired finished product, different monomer units, various chain-transfer agents to establish the desired molecular weight or also monomers having reactive groups for subsequently planned post-treatments (for example amino groups or sulfonate groups to improve the dye affinity of fibres for acidic or basic dyes respectively).

Industrially significant processes for the production of polyamides proceed, without exception, by melt polycondensation. In this context, hydrolytic polymerisation of lactams is also understood as polycondensation.

However, due to the very rapid increase in melt viscosity which accompanies a rise in molecular weight, these processes only yield relatively low molecular weight products, as an excessively high melt viscosity gives rise to various problems.

Temperature control and removal of the water of reaction accordingly become increasingly difficult, while the long reaction time at the elevated temperatures which are required results in more extensive secondary reactions and gel particle formation, which may dramatically impair the quality of the final product. Spinning also becomes increasingly difficult at very high melt viscosities.

Solid phase post-condensation (SPPC) here provides decisive advantages. Due to the far lower reaction temperatures (approx. 150 to 230° C. in comparison with 250 to 280° C. in the case of melt condensation), the risk of unwanted secondary reactions and gelation is reduced. Since the material to be subjected to post-condensation comprises defined particles having an interstitial volume, it is not problematic to maintain a uniform reaction temperature and to remove the residual water. The particle form also means that there are no spinning problems.

However, the achievable molecular weight is limited with SPPC too, as the viscosity values of the products level out to a plateau. While the height of this viscosity plateau may indeed be raised by increasing the temperature, such an increase then in turn gives rise to problems such as secondary reactions and gelation.

There is accordingly a requirement for a process which, in an industrially readily controllable manner, permits the production of high viscosity polyamides in a short reaction time and under mild conditions.

It would furthermore be desirable to be able reliably and rapidly to produce polyamides which exhibit very high melt viscosities at low shear rates, as are required, for example, for extruding large tubes or for extrusion blow moulding of large hollow mouldings (for example automotive ventilation tubes or tanks or automotive intake manifolds).

Known processes for the production of high viscosity polyamides are solid phase post-condensation of medium viscosity linear polyamides and the incorporation of branching agents into the polymer chains. The latter may be performed during polycondensation in a batch process or in a continuous tubular reactor. The incorporation of branching agents such as tri- and tetrafunctional carboxylic acids or amines, which are introduced with monomers in the polycondensation reaction, normally gives rise to non-homogeneous products with a strong tendency towards forming gel particles and specks. According to EP 0 345 648 B1, it is possible to reduce the formation of specks by maintaining certain quantity ratios between the feed materials.

As an alternative to incorporating branching agents during polycondensation, branching agents may also be incorporated into polyamides by compounding (for example in twin-screw extruders). EP-A-774 480 describes a process in which trimesic acid is incorporated into a polyamide prepolymer by compounding and then subjected to solid phase post-condensation. Stated advantages of this process are a, readily controllable molecular weight, good flowability and overall crystallinity while avoiding formation of gel particles and crosslinking. A disadvantage of this process is the additional processing step of compounding in comparison with incorporation of the branching agent during the polycondensation reaction.

Incorporating branching agents during polycondensation usually gives rise to partially crosslinked structures or gel particles and to very high viscosities, which in particular give rise to problems during spinning of the polymer melt. Similar problems are also observed when incorporating branching agents during compounding.

It has surprisingly been found that incorporating certain branching agents, such as for example polyfunctional amines, which contain at least one secondary amino group or are reacted with salts containing such amines and dicarboxylic acids, in a two-stage process does not exhibit the disadvantages of the prior art.

In particular with trifunctional amines (such as for example diethylenetriamine), preferably in quantities of 0.1 to 1.0 wt. %, particularly preferably in quantities of 0.2 to 0.8 wt. %, an initially free-flowing, largely unbranched and gel particle-free polyamide which may very readily be spun and pelletised is obtained during polycondensation in Incorporating branching agents during polycondensation usually gives rise to partially crosslinked structures or gel particles and to very high viscosities, which in particular give rise to problems during spinning of the polymer melt. Similar problems are also observed when incorporating branching agents during compounding.

It has surprisingly been found that incorporating certain branching agents, such as for example polyfunctional amines, which contain at least one secondary amino group, in a two-stage process does not exhibit the disadvantages of the prior art.

In particular with trifunctional amines (such as for example diethylenetriamine), preferably in quantities of 0.1 to 1.0 wt. %, particularly preferably in quantities of 0.2 to 0.8 wt. %, an initially free-flowing, largely unbranched and gel particle-free polyamide which may very readily be spun and pelletised is obtained during polycondensation in a continuous polycondensation process. Polycondensation is preferably performed in the presence of conventional catalysts and chain terminators/chain-transfer agents. The polyfunctional amines are used in combination with dicarboxylic acids or more highly functional carboxylic acids. The molar ratio of tri- or more highly functional amine to dicarboxylic acid is thus preferably >1. A pseudoplastic PA, which exhibits low viscosities at elevated shear rates and very high viscosities at low shear rates, is obtained in a second step by solid phase post-condensation.

The application accordingly provides a process for the production of polyamides, which is characterised in that, in a first reaction step, suitable monomers such as caprolactam or an aliphatic aminocarboxylic acid are reacted with polyfunctional amines, which contain at least one secondary amino group, and/or with salts containing such amines and dicarboxylic acids, and polymerisation in an autoclave. A continuous process may comprise, for example, polymerisation in a "fully continuous" tubular reactor. Production preferably proceeds in accordance with a continuous process, particularly preferably in a fully continuous tubular reactor.

The specific polyfunctional amines which contain at least one secondary amino group are here preferably tri- and/or tetrafunctional amines, which are preferably used in quantities of 0.1 to 1.0 wt. %, relative to the introduced quantity of caprolactam.

In one particularly preferred variant, diethylenetriamine is used as the amine, preferably in quantities of 0.1 to 1.0 wt. %, preferably of 0.2 to 0.8 wt. %, relative to the introduced quantity of caprolactam.

The viscosity of the mixture after the first and second process steps is important. After the first process step, the melt viscosity at 270° C. is between 120 and 1500 Pas, preferably between 200 and 1000 Pas, and after the second step, it is between 1000 and 8000 Pas in order to achieve the best results, wherein melt viscosity is measured at a shear rate of 10 s$^{-1}$.

Preferred polyamides from the process according to the invention are both partially crystalline and amorphous polyamides, which may be produced from diamines and dicarboxylic acids and/or lactams having at least 5 ring members or corresponding amino acids.

Starting products which may be considered are aliphatic and/or aromatic and/or semi-aromatic dicarboxylic acids such as adipic acid, 2,2,4- and 2,4,4-trimethyladipic acid, azelaic acid, sebacic acid, decanedicarboxylic acid, dodecanedicarboxylic acid, isophthalic acid, terephthalic acid, aliphatic and aromatic diamines, such as hexamethylenediamine, 2,2,4- and 2,4,4-trimethylhexamethylenediamine, the isomeric diaminodicyclohexylmethanes, diaminodicyclohexylpropanes, isophoronediamine, the isomeric xylylenediamines, bisaminomethylcyclohexane, aminocarboxylic acids such as aminocaproic acid, aminoundecanoic acid, aminolauric acid or the corresponding lactams. Copolyamides prepared from two or more of the stated monomers are included. preferably used in quantities of 0.1 to 1.0 wt. %, relative to the introduced quantity of caprolactam.

In one particularly preferred variant, diethylenetriamine is used as the amine, preferably in quantities of 0.1 to 1.0 wt. %, preferably of 0.2 to 0.8 wt. %, relative to the introduced quantity of caprolactam.

The viscosity of the mixture after the first and second process steps is important. After the first process step, the melt viscosity at 270° C. is between 120 and 1500 Pas, preferably between 200 and 1000 Pas, and after the second step, between 1000 and 8000 Pas in order to achieve the best results, wherein melt viscosity is measured at a shear rate of 10 s$^{-1}$.

Preferred polyamides from the process according to the invention are both partially crystalline and amorphous polyamides, which may be produced from diamines and dicarboxylic acids and/or lactams having at least 5 ring members or corresponding amino acids.

Starting products which may be considered are aliphatic and/or aromatic and/or semi-aromatic dicarboxylic acids such as adipic acid, 2,2,4- and 2,4,4-trimethyladipic acid, azelaic acid, sebacic acid, decanedicarboxylic acid, dodecanedicarboxylic acid, isophthalic acid, terephthalic acid, aliphatic and aromatic diamines, such as hexamethylenediamine, 2,2,4- and 2,4,4-trimethylhexamethylenediamine, the isomeric diaminodicyclohexylmethanes, diaminodicyclohexylpropanes, isophoronediamine, the isomeric xylylenediamines, bisaminomethylcyclohexane, aminocarboxylic acids such as aminocaproic acid, aminoundecanoic acid, aminolauric acid or the corresponding lactams. Copolyamides prepared from two or more of the stated monomers are included.

Caprolactams are particularly preferably used, very particularly preferably ε-caprolactam.

The fillers may be added before, during or after polymerisation of the monomers to yield the polyamide. If addition of the fillers according to the invention proceeds after polymerisation, it is preferably performed by addition to the polyamide melt in an extruder. If addition of the fillers according to the invention proceeds before or during polymerisation, polymerisation may comprise phases which are performed in the presence of 1 to 50 wt. % of water.

On addition, the fillers may already be present as particles of the particle size which ultimately occurs in the moulding composition. Alternatively, the fillers may be added in the form of precursors, from which the particles which ultimately occur in the moulding composition are obtained only over the course of addition or incorporation. These precursors may contain auxiliary substances which act, for example, to stabilise the precursor or to ensure a finely divided distribution of the particles in the moulding composition. Such auxiliary substances may, for example, be surface modifiers. In the case of silicon dioxide as filler, such a precursor may be, for example, silica sol or water glass. In the case of the stated example of silica sol, auxiliary substances which stabilise the sol, such as for example alkali solutions, such as sodium hydroxide solution or ammonia, are conventionally used. After the sol/gel transition, these auxiliary substances may remain in the resultant particles.

The stated fillers are used in a concentration of 0.1 to 10 wt. %, relative to the total weight of the polyamide. The stated fillers are preferably used in a concentration of 0.5 to 5 wt. %.

Red phosphorus may, for example, be considered as a fire or flame retardant, as known for example from DE-A-3 713 746 A1 (=U.S. Pat. No. 4,877,823) and EP-A-299 444 (=U.S. Pat. No. 5,081,222). Red phosphorus is primarily added to glass fibre reinforced PA 66 and 6/6T. Due to the intrinsic red colour of the phosphorus and the pigment-like nature thereof, such compounds may often only be supplied in dark colours. Moreover, on exposure to moisture and heat, they have a tendency to form phosphine and phosphates (by disproportionation of the phosphorus). Phosphine corrodes, for example, copper-containing contacts in electrical installations and equipment. Phosphates, on the other hand, form conductive deposits between electrical contacts. Suitable stabilisers inhibit, but do not suppress, the phosphorus disproportionation reaction.

Brominated diphenyls or diphenyl ethers in combination with antimony trioxide have, however, also long been used as an additive for polyamides. The following chlorinated cycloaliphatic hydrocarbons (Dechlorane® plus from Occidental Chemical Co.), brominated styrene oligomers (for example in DE-A-2 703 419) and ring-brominated polystyrenes (for example Pyro-Chek 68® from FERRO Chemicals) are increasingly being used.

Zinc salts or iron oxides are also used as synergists for the stated halogen compounds. Most halogen-based flame retardants begin to decompose at the processing temperatures for polyamides, resulting in the formation of corrosive gases. As a consequence, for example the electrical contacts in switches or electrical installations are destroyed. Moreover, the electrical properties of the polyamides are impaired by the ionogenic cleavage products formed.

As another alternative, melamine salts have in particular proved successful as flame retardants, especially for unreinforced polyamides. Such products have a light intrinsic colour and have good electrical properties. The relatively low decomposition temperature of melamine salts is disadvantageous.

Magnesium hydroxide has furthermore long successfully been used as a flame retardant for polyolefins and elastomers. In comparison with aluminium hydroxide, which was previously used, it has the advantage of a higher water elimination temperature (>340° C.). The use of magnesium hydroxide in polyamides is described in the literature. However, a concentration of in excess of 55% is necessary in order to achieve a UL 94 (US fire testing according to Underwriters' Laboratories) rating of V0 at a thickness of 1.6 mm. Processing such products is problematic. The mechanical properties of mouldings produced therefrom decline to a lower level. Surface quality is moreover appreciably impaired. EP-A-0 335 165 (=U.S. Pat. No. 4,963,610) proposes blending polyamide with 0.1 to 20 wt. % of a functionalised olefin homo- or copolymer and 3 to 30 wt. % of a reinforcing fibre, in order to produce flame retardant compounds comprising 40 to 70 wt. % of specific grades of magnesium hydroxide (specific surface area less than 18 $m^2/g$).

Components comprising little magnesium hydroxide have, however, also proved successful if polyamides are used with thermoplastic aromatic polymers and polyamide according to EP-A-605 861.

Suitable impact modifiers are, for example, in particular diepoxides based on diglycidyl ethers (bisphenol A and epichlorohydrin), based on aminoepoxy resins (aniline and epichlorohydrin), based on diglycidyl esters (cycloaliphatic dicarboxylic acids and epichlorohydrin), individually or mixed with each other, as well as preferably diepoxides based on 2,2-bis[p-hydroxyphenyl]propane diglycidyl ethers, bis[p-N-methyl-N-2,3-epoxypropylamino)phenyl] methane, as are described in EP-A-685 528. These may improve the sag resistance of the melt and the weldability of extruded or injected parts by, for example, the heating element, heat sealing, vibration or high frequency method.

The polyamides produced according to the invention may be further processed by any process known in the prior art for polyamides, for example by injection moulding, extrusion, coextrusion, extrusion blow moulding, coating, lamination, thermoforming or blow moulding. In the case of films, extrusion or coextrusion may, for example, proceed by the "chill roll" process or by the blown film extrusion or coextrusion method. Conventional commercial coupling agents may be used in the case of multilayer films or hollow articles. The injection moulding, extrusion or extrusion blow moulding processes are, however, preferred.

Films and sheets of polyamides according to the invention may moreover be shaped by thermoforming and/or other similar thermal moulding processes.

Typical products made from the polyamides according to the invention are any products known in the prior art made from polyamides or polyamide blends, preferably films, fibres, hollow articles or other mouldings.

Films or hollow articles may consist of only one layer of polyamide or may exhibit a multilayer structure. In the case of the multilayer structure, the further layers may consist, for example, of polyolefins, such as for example polyethylene or polyethylene copolymers, such as for example copolymers of ethylene and acrylic acid or methacrylic acid or barrier polymers, such as for example polyvinylidene chloride or copolymers of ethylene and vinyl alcohol (known as EVAL or EVOH).

The polyamides produced according to the invention may, however, also be used for the production of other mouldings such as profiles, strips, tubes or rails.

A preferred use is for the production of automotive intake manifolds by the multishell process, wherein the moulding compositions may optionally also be modified with reinforcing substances such as glass fibres, C fibres, aramid fibres and/or mineral fillers such as kaolin, wollastonite, talcum and conventional stabilisers, colorants, processing auxiliaries etc.

EXAMPLES

Comparative Example 1

Branching in a Fully Continuous Tubular Reactor

Using a two-stage fully continuous tubular reactor consisting of a pressure stage and a decompression stage, caprolactam is polycondensed at approx. 270° C. in the presence of 0.58 wt. % (relative to caprolactam throughput) of a salt of trimesic acid (1,3,5-benzenetricarboxylic acid) and hexamethylenediamine (HMDA) consisting of 3 mol of hexamethylenediamine per 2 mol of trimesic acid. The water required at the start of the reaction and the branching agent (salt of trimesic acid and hexamethylenediamine) are apportioned as a common solution in a side stream into the pressure stage of the fully continuous tubular reactor. Caprolactam throughput is 12 kg/h. Further process parameters:

| | |
|---|---|
| Quantity of water at start of reaction | 0.5 wt. % |
| Residence time in pressure stage | 3.5 h |
| Residence time in a decompression stage | 17.7 h |

A high viscosity polyamide is obtained, which may be spun only with great difficulty. After subsequent pelletisation and the conventional aqueous extraction to remove low molecular weight constituents, a product is obtained which is contaminated by gel particles, which are attributable to local crosslinking.

Comparative Example 2

A mixture of 273 g (2.41 mol) of caprolactam, 31.4 g (0.24 mol) of aminohexanoic acid, 0.9 g (8.72 mmol) of diethylenetriamine and 1.27 g (8.72 mmol) of adipic acid is stirred under nitrogen for 1 hour at 200° C. in a double-walled, oil-heated glass apparatus with a spiral helical ribbon stirrer and heated glass nozzle. The temperature is then raised to 270° C. and the mixture polycondensed for 4 h at this temperature. The resultant viscosity is so high that the product may only be spun very slowly and with difficulty (the temperature must be raised to 290° C. just to make spinning possible).

Example 3

Branching with Diethylenetriamine in Fully Continuous Tubular Reactor

Using a two-stage fully continuous tubular reactor consisting of a pressure stage and a decompression stage, caprolactam is continuously polycondensed at approx. 270° C. with a salt of diethylenetriamine and adipic acid (molar ratio 1:1) in the presence of acetic acid. The water required at the start of the reaction and the branching agent (salt of diethylenetriamine and adipic acid) are apportioned as a common solution in a side stream into the pressure stage of the fully continuous tubular reactor. Caprolactam throughput is 12 kg/h. (Concentration ratios of branching agent, cf. Table 1).

of diethylenetriamine and 0.42 wt. % of adipic acid (diethylenetriamine/adipic acid molar ratio: 1.08) and 0.086 wt. % of propionic acid. The adipic acid and diethylenetriamine are here continuously apportioned in a side stream as an aqueous solution consisting of 21.6 wt. % of diethylenetriamine, 28.4 wt. % of adipic acid and 50 wt. % of water. Caprolactam throughput is 500 kg/h, the temperature is in the range from 250–280° C. A high viscosity polyamide is obtained, which may be spun without difficulty. After subsequent pelletisation and the conventional aqueous extraction to remove low molecular weight constituents, a product is obtained which may straightforwardly be post-condensed to very high melt viscosities by solid phase post-condensation under nitrogen at 170–180° C.

Example 5 (Comparative Test)

Conventional commercial PA6 of medium viscosity (relative solution viscosity of a 1% solution in meta-cresol: 2.9; for example Durethan B 29) is post-condensed for 10 h at 180° C. in a stream of dry nitrogen. The melt viscosity rises, but remains distinctly below the level of the branched polyamides.

| E.g. | Trifunctional branching agent (wt. % relative to CPL) | Acid (wt. % relative to CPL) | Melt properties | After first step Melt viscosity [Pas] at 270° C.; shear rate 10 s$^{-1}$/1000 s$^{-1}$ | After second step of solid phase post-condensation at 180° C. (conditions; time stated from when desired temperature of 180° C. is reached) Melt viscosity [Pas] at 270° C.; shear rate 10 s$^{-1}$/1000 s$^{-1}$ |
|---|---|---|---|---|---|
| Comp. 1 | Trimesic acid (0.32) | — | Spinning problematic, severe formation of gel particles | 4300/302 | Not measurable; partially insoluble |
| Comp. 2 | Diethylenetriamine (0.32) | Aminohexanoic acid (0.11) | Spinning very problematic | 2100/315 | Not measurable; partially insoluble |
| 3 | Diethylenetriamine (0.3) | Acetic acid (0.1) | Spinning straightforward, relatively low viscosity, uncrosslinked, no gel particles | 780/170 | 2990/350 (10 h; 50 L helical ribbon mixer) |
| 4 | Diethylenetriamine (0.32) | Propionic acid (0.086) | Spinning straightforward, relatively low viscosity, uncrosslinked, no gel particles | 410/125 | 3260/330 (8 h; 1000 kg, vacuum tumble dryer) |
| Comp. 5 | No branching agent; linear, medium viscosity PA6 (e.g. Durethan B 29) | | Spinning straightforward, relatively low viscosity, uncrosslinked, no gel particles | 200/120 | 480/210 (10 h; 50 L - helical ribbon mixer) |

Further process parameters:

| | |
|---|---|
| Quantity of water at start of reaction | 1.5 wt. % |
| Residence time in pressure stage (3.4 bar) | 3 h |
| Residence time in a decompression stage | 12.5 h |

A high viscosity polyamide is obtained, which may be spun without difficulty. After subsequent pelletisation and the conventional aqueous extraction to remove low molecular weight constituents, a product is obtained which may straightforwardly be post-condensed to very high melt viscosities by solid phase post-condensation under nitrogen at 170–180° C.

Example 4

Using a single stage fully continuous tubular reactor, caprolactam is polycondensed in the presence of 0.32 wt. %

What is claimed is:

1. Polyamides prepared from diamines and dicarboxylic acids and/or lactams having at least 5 ring members or corresponding amino acids and branching agents in the form of trifunctional amines that include at least one secondary amino group.

2. A process for the production of polyamides comprising (A) reacting diamines and dicarboxylic acids and/or lactams having at least 5 ring members or corresponding amino acids with trifunctional amines, which contain at least one secondary amino group, and/or with salts containing such amines and dicarboxylic acids to form a reaction product having melt viscosity at 270° C. of 120 to 1500 Pas, and (B) processing said reaction product by solid phase post-condensation to yield a product having melt viscosity of 1000 to 8000 Pas, said melt viscosity measured at a shear rate of 10 s$^{-1}$.

3. The process of claim 2 wherein said A is performed in a fully continuous tubular reactor.

4. The process of claim 2 wherein the solid phase post-condensation is performed in the temperature range of 150–210° C.

5. The process of claim 2 wherein reaction product obtained at (A) is subjected to extraction of dimers and residual monomers before the solid phase post-condensation.

6. The process of claim 2 wherein said (A) caprolactam is reacted.

7. The process of claim 2 wherein said amine is diethylenetriamine.

8. The polyamide prepared by the process of claim 2.

9. A method of using the polyamide of claim 8 comprising producing a product selected from the group consisting of film, fiber, injection molded article, and an extruded article.

10. A method of using the polyamide of claim 8 comprising producing a hollow article by the extrusion or extrusion blow molding process.

11. A molding composition comprising the polyamide of claim 8.

12. The molding composition of claim 11 further containing at least one member selected from the group consisting of reinforcing materials and mineral fillers.

13. A method of using the composition of claim 11 comprising production of articles by the thermoforming process.

14. The polyamide of claim 1 wherein lactam is caprolactam and where the branching agent is present in an amount of 0.1 to 1.0 wt. %, relative to the quantity of caprolactam.

15. Mouldings containing the polyamides of claim 1.

* * * * *